United States Patent [19]
Lewis

[11] 3,768,876
[45] Oct. 30, 1973

[54] PROPORTIONING VALVE WITH LOAD SENSING BLEND BACK

[75] Inventor: Richard L. Lewis, South Bend, Ind.

[73] Assignee: The Bendix Corporation, South Bend, Ind.

[22] Filed: June 11, 1971

[21] Appl. No.: 152,322

[52] U.S. Cl.............. 303/22 R, 303/6 C, 303/24 F, 188/349
[51] Int. Cl.............................................. B60t 8/18
[58] Field of Search............... 303/6 C, 22 A, 22 R, 303/24; 188/349

[56] References Cited
UNITED STATES PATENTS

| | | | |
|---|---|---|---|
| 3,501,203 | 3/1970 | Falk | 303/22 A X |
| 3,162,491 | 12/1964 | VanWinsen | 303/22 A |
| 3,169,800 | 2/1965 | Oberthur | 303/22 A |
| 3,383,139 | 5/1968 | Chevreux | 303/24 A |
| 3,508,792 | 4/1970 | Bueler | 188/349 |

Primary Examiner—Duane A. Reger
Assistant Examiner—D. C. Butler
Attorney—Ken C. Decker

[57] ABSTRACT

A control device is disclosed for use in a vehicle hydraulic braking system which proportions the braking effort between the front wheels of the vehicle and the rear wheels. The control device includes a housing defining a bore therewithin, and a pair of valve members within the bore dividing the latter into an inlet chamber which is communicated to one side of the vehicle's split system master cylinder and an outlet chamber which is communicated to either the front or the rear brakes of the vehicle. The valve members permit substantially uninhibited fluid communication between the inlet and the outlet chambers until a relatively low predetermined pressure level is attained in the inlet chamber, whereupon the valve members begin proportioning flow of fluid between the inlet and outlet chambers to establish a lower fluid pressure level in the outlet chamber than the fluid pressure level established in the inlet chamber. A piston is provided within the bore so that when a predetermined pressure level in the inlet chamber is attained, the piston overcomes the force of a spring to move into operative engagement with the one valve member. After this occurs, the pressure level in the outlet chamber will increase more rapidly than the pressure level in the inlet chamber is increased, until the pressure level in the outlet chamber is again substantially equal to the pressure level in the inlet chamber whereupon substantially uninhibited fluid communication is again permitted between the inlet and outlet chambers. The piston is also operably connected to sensing means which reflects the relative position between the axle of the vehicle and the body of the vehicle, so that the piston is moved away from the valve member as the load carried by the vehicle increases. Therefore, a proportionally greater fluid pressure level in the inlet chamber will be required for a heavy loaded vehicle before the piston engages the one valve member.

11 Claims, 3 Drawing Figures

Patented Oct. 30, 1973

3,768,876

INVENTOR.
RICHARD L. LEWIS
BY

PROPORTIONING VALVE WITH LOAD SENSING BLEND BACK

BACKGROUND OF THE INVENTION

This invention relates to a proportioning valve for use in a vehicle hydraulic braking system.

The ideal relationship between the braking pressure supplied to the front wheel brakes of an automotive vehicle and the braking pressure supplied to the rear wheel brakes of the same vehicle has been determined both theoretically and experimentally. In order to more closely approximate the ideal pressure relationship between the front and rear brakes of the vehicle, it has become customary to employ a control device, such as a proportioning valve, in one of the brake lines. This has most commonly been done by reducing the braking pressure supplied to the rear wheel drum brakes in a vehicle employing disc brakes on the front wheels and drum brakes on the rear wheels. Although proportioning devices of this type have been known for many years and work quite well, they do not closely approximate the ideal relationship between the front and rear wheel braking pressures of commercial vehicles. The difficulty arises in that the ideal relationship between the front and rear wheel braking pressure changes as the load carried by the vehicle changes. Since the loads carried by commercial vehicles vary over a substantial range, it has been necessary to employ proportioning valves in which the braking pressure at which the proportioning action is initiated is varied according to the vehicle load. Although these proportioning valves more closely approximated the ideal brake-pressure relationship between the front and rear wheel brakes than did proportioning valves which were not load sensing, substantial deviations still occurred.

SUMMARY OF THE INVENTION

Therefore, an important object of my invention is to provide a control device or proportioning valve for use in a vehicle hydraulic system which controls or proportions the braking pressure delivered to the front wheel or rear wheel brakes of the vehicle in such a way that the ideal pressure relationship between the front wheel brakes and the rear wheel brakes is closely approximated.

Another important object of my invention is to provide a proportioning valve that reduces the fluid pressure level applied to one set of the vehicle's brakes until the pressure level in the master cylinder reaches a predetermined level whereupon the proportioning valve opens to permit the full master cylinder pressure to be delivered to the rear wheel brakes of the vehicle, the predetermined level at which the proportioning valve opens being varied according to the weight carried by the vehicle.

DETAILED DESCRIPTION

Figure 1:
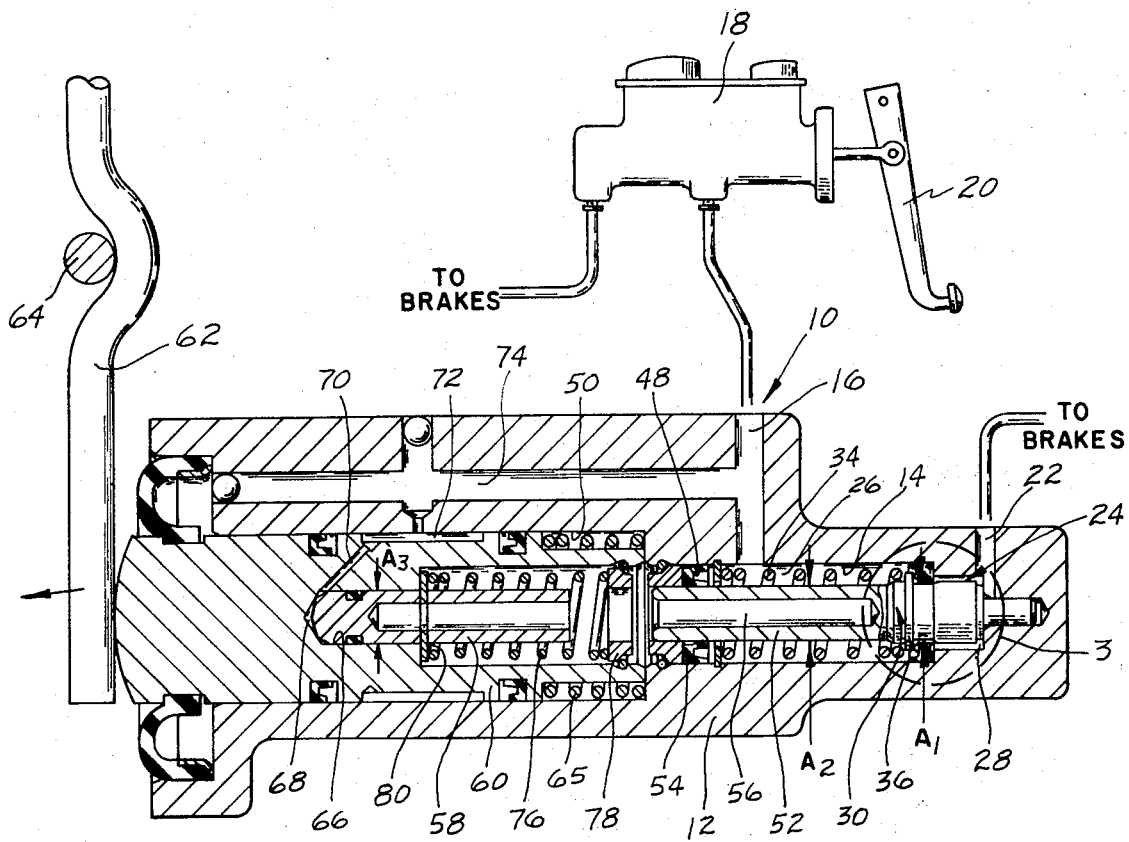
FIG. 1 is a schematic view of a vehicle hydraulic brake unit with a proportioning valve made pursuant to the teachings of my present invention illustrated in cross section.

Referring now to the drawing, a control valve generally indicated by the numeral 10 includes a housing 12 defining a bore 14 therewithin. An inlet port 16 communicates the bore 14 with one side of a split system master cylinder 18. The other side of the master cylinder 18 is communicated directly to the rear brakes of the vehicle. Pressure is developed in the master cylinder 18 in the normal manner by operation of a conventional pedal 20 which is mounted in the operator's compartment of the vehicle. The housing 12 further includes an outlet port 22 which communicates the bore 14 with the front wheel brakes of the vehicle. Although the control device 10 is illustrated as controlling fluid communication between the master cylinder and the front wheel brakes of the vehicle, it will be readily appreciated by those skilled in the art that the control device 10 could also be used in the rear brake line.

Figure 3:
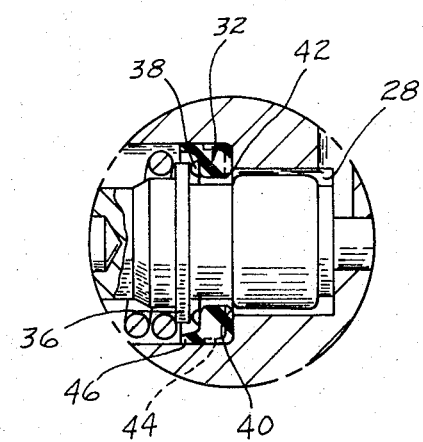
FIG. 3 is enlarged, detail view of the circumscribed portion of FIG. 1.

Valve means generally indicated by the numeral 24 divide the bore 14 into an inlet chamber 26 which communicates with the inlet port 16 and an outlet chamber 28 which communicates with the outlet port 22. Valve means 24 includes an elongated, piston-like, first valve member 30 and an annular, resilient, second valve member 32 which circumscribes the valve member 30 at the right hand end of the bore, viewing FIG. 1. A spring 34 within the bore 14 yieldably urges a shoulder 36 on the first valve member 30 against spaced projections 38 on the valve member 32. Therefore, when the shoulder 36 is urged against the projections 38, fluid communication between the chambers 26 and 28 is permitted around the projections 38. Another shoulder 40 on the valve member 30 is adapted to seal against the peripheral sealing surface 42 of the valve member 32, to thereby prevent fluid communication between the chambers 26 and 28 when the shoulder 40 engages the surface 42. Passages 44, indicated by the dashed lines in FIGS. 1 and 3, extend around the periphery of the valve member 32 and permit fluid communication between the outlet chamber 28 and the inlet chamber 26 when the pressure level in the latter is less than the pressure level in the outlet chamber 28. However, a flag 46 is also provided which closes the passages 44 when the pressure level in the chamber 26 is greater than the pressure level in the chamber 28.

The bore 14 includes a smaller diameter section 48 and a larger diameter section 50. The valve members 30 and 32 are carried in the smaller diameter section 48. The valve member 30 includes a stem 52 which extends through the smaller diameter section 48 and is sealed against the latter by an annular seal 54. The space defined within the stem 52 indicated by the numeral 56 is vented to the exterior of the housing 12. Therefore, the effective area of the valve member 30 against which fluid pressure in the outlet chamber 28 acts is equal to the internal diameter $A_1$ of the valve means 32, while the effective area of valve member 30 against which fluid pressure in the chamber 26 acts is equal to area $A_1$ minus area $A_2$, the area defined by the outer diameter of the stem 52.

First and second concentric pistons 58 and 60 are slidably mounted in the larger diameter portion 50 of the bore 14. One end of the piston 60 extends from the open end of the bore 14 and engages one end of a bar 62. The other end of the bar 62 is secured to the body of the vehicle, and the bar 62 is adapted to pivot about the member 64 to reflect the position of the axle of the vehicle relative to the body of the vehicle. Therefore, the end of the bar 62 which engages the piston 60 moves away from the housing 12 as the load carried by the vehicle increases, in the direction of the arrow. A spring 65 within the bore 14 yieldably urges the end of the piston 60 into engagement with the end of the bar 62 so that, as the load carried by the vehicle increases, the piston 60, and therefore, the piston 58, will move away from the valve member 30.

The piston 60 further defines a blind bore 66 therewithin, the open end of which faces the smaller diameter portion 48 of the bore 14. The first piston 58 is slidably received within the blind bore 66 and cooperates with the closed end of the latter to define a variable volume character 68 therebetween. A passage 70 communicates the variable volume chamber 68 with an annular chamber 72 defined between the outer surface of the piston 60 and the wall of the bore 14. The annular chamber 72 is communicated with the inlet port 16 by a passage 74. The axial length of the annular chamber 72 is sufficiently long to insure communication between the passages 70 and 74 throughout the entire range of movement of the piston 60. A spring 76 is disposed between a retainer 78 carried by the piston 60 and a shoulder 80 on the piston 58 and yieldably urges the latter toward the closed end of the bore 66.

MODE OF OPERATION

Figure 2:
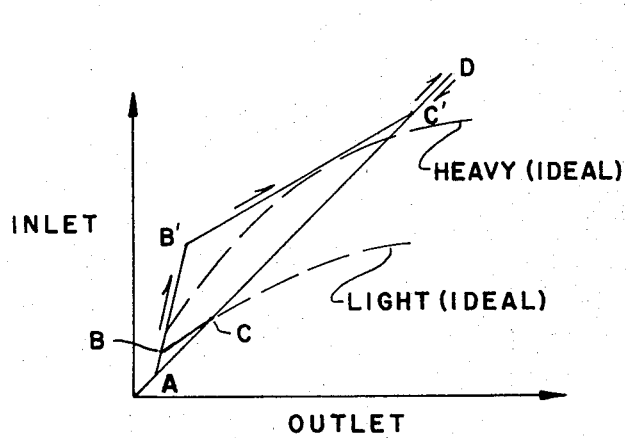
FIG. 2 is a graphical representation of the operation of the valve disclosed in FIG. 1.

The valve 10 is illustrated in FIG. 1 with the various components thereof disposed in the positions which they assume when the brakes of the vehicle are released and when the vehicle is unloaded. When a brake application is effected, pressure is communicated into the inlet chamber 26 and immediately flows into the outlet chamber 28 since the shoulder 42 is spaced from the sealing surface 40. However, a force will be exerted on the valve member 30 urging the latter to the left viewing FIG. 1, since the fluid pressure in the outlet chamber 28 acts across the entire area $A_1$, while the fluid pressure in the chamber 26 acts upon an area equal to the area $A_1$ minus the area $A_2$. When this force is sufficiently great to overcome the force exerted by the spring 34, the shoulder 40 engages the surface 42, thereby terminating the fluid communication between the inlet chamber 26 and the outlet chamber 28. This state is represented by point A in FIG. 2. Ideally, the pressure level necessary to close the valve is made as low as possible so the force exerted by the spring 34 must be extremely small. After the valve closes initially, subsequent increases in the fluid pressure level in the chamber 26 will reopen the valve; however, because of the area differential across the valve member 30, only a portion of the pressure increase will be communicated to the outlet chamber 28. Therefore, a lower pressure level is established in the outlet chamber 28 than the pressure level existing in the inlet chamber 26. This proportioning action of the valve 10 is represented by line A–B in FIG. 2.

As can be seen by those skilled in the art, fluid pressure communicated to the chamber 26 is also communicated to the variable volume chamber 68. When the fluid pressure level in the variable volume chamber 68 is sufficiently great to overcome the force exerted by the spring 76, the latter yields to permit the piston 58 to engage the end of the stem 52 on the valve member 30. This state is represented by point B in FIG. 2. After this pressure level is attained and the piston 58 engages the stem 52, the effective area $A_3$ of the piston 58 against which fluid pressure in the chamber 68 acts is added to the effective area $A_1$ minus $A_2$ of the valve member 30 against which fluid pressure in the chamber 26 acts. The sum of the areas $A_1$ minus $A_2$ plus $A_3$ is designed to be greater than the area $A_1$. Therefore, after a master cylinder pressure is attained in the variable volume chamber 68 sufficient to overcome the spring 76, the effective area of the valve member 30 exposed to the inlet fluid pressure level is greater than the area $A_1$ which is exposed to the outlet fluid pressure level. Therefore, subsequent increases in the master cylinder pressure will cause the pressure level in the outlet chamber 28 to increase more rapidly than the fluid pressure increase in the inlet chamber 26. This action of the valve is represented by line B–C in FIG. 2. When the pressure level in the outlet chamber 28 again equals the pressure level in the inlet chamber 26, as represented by point C on FIG. 2, substantially uninhibited fluid communication is permitted between the inlet and outlet chambers.

When the load carried by the vehicle is increased, the end of the bar 62 engaging the end of the piston 60 moves away from the housing 12. The spring 65 therefore urges the piston 60 away from the valve member 30. Since the first piston 58 moves with the piston 60, it too will be moved away from the valve stem 52. When the brakes of the vehicle are applied when the vehicle is heavily loaded, the valve operates substantially as described above. However, when the pistons 58 and 60 are moved away from the valve member 30, a substantially greater fluid pressure level must be generated in the variable volume chamber 68 before the piston 58 will engage the stem 52, since the spring 76 must be compressed for a much greater distance. Therefore, the piston 58 will not engage the stem 52 until a pressure level is created in the chamber 68 corresponding to point B' on FIG. 2. However, after the piston 58 engages the stem 52, the valve 30 operates as described above, in which the pressure level in the chamber 28 is increased more rapidly than is the pressure level in the chamber 26. This action of valve member 30 is represented by line B'C' on FIG. 2. When the pressure level in the outlet chamber 28 again equals the pressure level in the inlet chamber 26, the valve 30 remains open and substantially uninhibited fluid communication is permitted between the inlet and the outlet chambers.

When the brake pressure in the chamber 26 is reduced, the valve member 30 engages the surface 42 so that the pressure in the inlet chamber 26 is decreased for a small amount without a corresponding decrease in the outlet chamber 28. As the pressure level in the chambers 26 and 68 is decreased still further, the valve member 30 cooperates with the valve member 32 to expand the volume of the outlet chamber 28 to thereby reduce the fluid pressure level in the outlet chamber 28 as the pressure level in the inlet chamber 26 is reduced. When the pressure level in chambers 26 and 68 is reduced further, the force of the spring 76 returns the piston 58 to the position illustrated in FIG. 1. Subsequent reductions in the pressure in the chamber 26 causes the valve member 30 to move further to the left viewing FIG. 1, thereby again expanding the outlet chamber 28 to further relieve pressure in the latter. When the pressure in the chamber 26 is reduced still further, fluid flows through the passage 44 between the outlet chamber 28 into the inlet chamber 26, until the pressure levels in the chambers 26 and 28 are again substantially equal, whereupon the spring 34 returns the valve member 30 to the position illustrated in the drawing, thereby permitting uninhibited fluid communication between the chambers 26 and 28.

I claim:

1. In a control device for use in a vehicle braking system:
   a housing having an inlet, an outlet, and a bore communicating the inlet with the outlet;
   valve means within said bore dividing the latter into an inlet chamber and an outlet chamber;
   said valve means restricting fluid communication between the inlet and outlet chambers to permit the fluid pressure level in the inlet chamber to increase more rapidly than does the fluid pressure level in the outlet chamber until a predetermined fluid pressure level is attained in said inlet chamber;
   other means in said bore cooperating with said valve means after said predetermined level is attained to increase the fluid pressure level in the outlet chamber more rapidly than the fluid pressure level in the inlet chamber is increased until the fluid pressure level in the outlet chamber becomes equal to the fluid pressure level in the inlet chamber; and
   sensing means operably connecting said other means to the body of the vehicle;
   said sensing means being responsive to the load carried by the vehicle to increase said predetermined pressure level at which said other means initially cooperates with said valve means as the load carried by the vehicle is increased.

2. The invention of claim 1:
   said valve means including a pair of valve members;
   said other means including a first piston slidable within said housing from a first position in which said first piston is spaced from one of said valve member to a second position in which said first piston engages said one valve member when the fluid pressure level in said inlet chamber attains the predetermined level;
   said first piston being responsive to the fluid pressure level in said inlet chamber to engage said one valve member when the fluid pressure level in said inlet chamber attains said predetermined level.

3. The invention of claim 2:
   said sensing means permitting said first piston to move away from said one valve member as the load carried by the vehicle is increased to thereby increase the stroke required of said first piston to move into engagement with said one valve member.

4. The invention of claim 3:
   said other means including a second piston slidable within said housing; and
   resilient means engaging one end of said second piston yieldably urging the other end of said second piston into engagement with said sensing means, whereby said second piston is moved away from said one valve member as the sensing means moves away from said housing;
   said first piston being carried by said second piston.

5. The invention of claim 4:
   said second piston defining a blind bore therewithin extending from said one end of said second piston;
   said first piston being slidably received within said blind bore and cooperating with the closed end of the latter to define a variable volume chamber therebetween; and
   means communicating said variable volume chamber with the fluid pressure level communicated to said inlet chamber.

6. The invention of claim 5:
   said one valve member having a larger effective area defined on one end of the latter exposed to the fluid pressure level in said outlet chamber and a smaller effective area defined on the other end of said one valve member exposed to the fluid pressure level in said inlet chamber;
   the sum of the smaller effective area on said one valve member and the effective area of said first piston exposed to the fluid pressure level communicated to said inlet chamber being greater than the larger effective area on said one valve member.

7. The invention of claim 2:
   said one valve member having a larger effective area defined on one end of the latter exposed to the fluid pressure level in said outlet chamber and a smaller effective area defined on the other end of said one valve member exposed to the fluid pressure level in said inlet chamber;
   said first piston having an effective area exposed to the fluid pressure level communicated to said inlet chamber;
   the sum of the smaller effective area on said one valve member and the effective area of said one piston exposed to the fluid pressure level communicated to said inlet chamber being greater than the larger effective area on said one valve member.

8. The invention of claim 6; and
   resilient means carried by said second piston yieldably urging said first piston toward the closed end of said blind bore.

9. The invention of claim 1:
   said valve means including a pair of valve members;
   said other means including first and second pistons slidably mounted in said bore, said second piston defining a blind bore therewithin slidably receiving said first piston, resilient means yieldably urging said one piston toward the closed end of the blind bore, and means communicating the fluid pressure level in said inlet chamber to the variable-volume chamber defined between the end of said first piston and the closed end of said blind bore;
   said first piston moving into engagement with one of said valve members when the fluid pressure level in said variable-volume chamber attains a value sufficient to overcome the force of said resilient means, said value being equal to said predetermined level;
   said second piston being responsive to said sensing means to carry said first piston away from said one valve member as the load carried by the vehicle is increased, whereby a greater fluid pressure level in said variable-volume chamber is required to drive said first piston into engagement with said one valve member.

10. The invention of claim 9:
    one end of said second piston extending from said bore;
    said sensing means being a bar reflecting the relative position of the body of the vehicle to the axle of the vehicle, one end of said bar engaging said one end of the second piston; and resilient means engaging the other end of said second piston to urge the one end of the latter into engagement with said bar.

11. In a control device for use in a vehicle braking system:

a housing having an inlet, an outlet, and a bore communicating the inlet with the outlet;

valve means in said bore dividing the latter into an inlet chamber and an outlet chamber;

one of said valve means having a larger effective area exposed to the fluid pressure level in said outlet chamber and a smaller effective area exposed to the fluid pressure level in said inlet chamber, and resilient means urging said valve members apart, said one valve member cooperating with the other valve member to meter fluid communication between said chambers when the force differential across said one valve member due to said difference in areas attains a first predetermined level sufficient to overcome said resilient means to thereafter increase the fluid pressure level in said inlet chamber more rapidly than the fluid pressure in the outlet chamber is increased;

said valve means including other means responsive to a second pre-determined level of the fluid pressure in said inlet chamber to increase the effective area of the valve means exposed to the fluid pressure level in said inlet chamber to a value greater than the area exposed to the fluid pressure level in the outlet chamber to thereafter permit the fluid pressure level in said outlet chamber to increase more rapidly than the fluid pressure level in said inlet chamber is increased; and sensing means responsive to the load carried by said vehicle for varying said second predetermined pressure level in accordance with the vehicle load.

* * * * *